United States Patent
Mukuda (10) Patent No.: US 7,824,593 B2
(45) Date of Patent: Nov. 2, 2010

(54) METHOD OF MANUFACTURING MOVING HANDRAIL FOR PASSENGER CONVEYOR

(75) Inventor: Muneaki Mukuda, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 438 days.

(21) Appl. No.: 11/533,414

(22) Filed: Sep. 20, 2006

(65) Prior Publication Data

US 2007/0074818 A1    Apr. 5, 2007

(30) Foreign Application Priority Data

Sep. 30, 2005  (JP) .............................. 2005-286572

(51) Int. Cl.
*B29C 45/14* (2006.01)

(52) U.S. Cl. .................... 264/279; 264/328.4

(58) Field of Classification Search ................ 156/502, 156/509; 264/279, 328.4; 425/44, 547, 548
See application file for complete search history.

(56) References Cited

U.S. PATENT DOCUMENTS

| | | | | |
|---|---|---|---|---|
| 3,481,807 A | * | 12/1969 | Kanamori .................... 156/159 |
| 4,548,663 A | * | 10/1985 | Worcester .................... 156/159 |
| 4,618,387 A | * | 10/1986 | Fisher et al. ............ 156/244.11 |
| 5,562,796 A | * | 10/1996 | Ertel ............................ 156/498 |
| 5,824,383 A | * | 10/1998 | Tuttle et al. .................... 428/60 |
| 5,986,026 A | * | 11/1999 | Wong et al. ................ 526/123.1 |
| 6,827,803 B1 | * | 12/2004 | Willis ............................ 156/157 |
| 6,848,571 B2 | * | 2/2005 | Allen et al. ................ 198/844.2 |
| 2002/0086076 A1 | * | 7/2002 | Chen ............................ 425/143 |
| 2002/0129887 A1 | * | 9/2002 | Majumdar et al. .......... 156/122 |
| 2003/0113398 A1 | * | 6/2003 | Chiu et al. .................... 425/548 |
| 2004/0121868 A1 | * | 6/2004 | Gregg et al. ................ 474/256 |

FOREIGN PATENT DOCUMENTS

| | | | |
|---|---|---|---|
| GB | 1297736 A | * | 11/1972 |
| JP | 1-202414 A | | 8/1989 |
| JP | 1-288411 A | | 11/1989 |
| JP | 2-128814 A | | 5/1990 |
| JP | 6-7914 U | | 2/1994 |
| JP | 10-329231 A | | 12/1998 |
| JP | 2001-328790 | | 11/2001 |
| JP | 2004-188601 A | | 7/2004 |
| JP | 2004-250154 A | | 9/2004 |
| WO | WO 97/37834 | | 10/1997 |

* cited by examiner

*Primary Examiner*—Joseph S Del Sole
*Assistant Examiner*—Ryan Ochylski
(74) *Attorney, Agent, or Firm*—Leydig, Voit & Mayer, Ltd.

(57) ABSTRACT

A belt splicing apparatus includes: a mold including a cavity into which connecting end portions of a resin-made belt are inserted, opposing each other, to connect the end portions by using a bonding resin; a heating unit that heats a bonding resin to more than a flow starting temperature of the bonding resin; and a pressure maintaining unit. The pressure maintaining unit includes: a reservoir communicating with the cavity and maintaining the bonding resin in a fluid state; a pressure transmitting member that transmits pressure to the bonding resin in the fluid state; an urging unit that urges the pressure transmitting member; and an urging force adjusting unit that adjusts an urging force applied by the urging unit.

18 Claims, 5 Drawing Sheets

METHOD OF MANUFACTURING MOVING HANDRAIL FOR PASSENGER CONVEYOR

BACKGROUND OF THE INVENTION

1. Field of the Invention

The present invention relates to a belt splicing apparatus which makes it possible to smoothly and firmly splice a resin-made belt formed of, for example, a thermoplastic resin, as well as a method of manufacturing a moving handrail for a passenger conveyor by using this splicing apparatus.

2. Description of the Related Art

In a conventional splicing apparatus for a moving handrail for a passenger conveyor, both end portions of the moving handrail and their vicinities, together with non-fusion bonded decorative rubber, are clamped between an upper mold and a lower mold, and are fusion bonded by being pressurized by tightening bolts and tightening nuts and by heating. Even if an operator does not cope with the operation manually, it is possible to prevent changes from occurring in the mold as the resin pressure increases with progress in the fusion bonding (e.g., refer to JP-A-2001-328790).

SUMMARY OF THE INVENTION

The conventional splicing apparatus for a moving handrail for a passenger conveyor makes it able to cope with a positive displacement in which the resin pressure increases as the fusion bonding of the handrail progresses. However the splicing apparatus is unable to cope with such as the molding shrinkage of the resin and a shortage of the resin material. Therefore, there have been problems in that a difference in level is likely to occur at the spliced portion owing to sink marks on the product surface due to the negative displacement and faulty fusion bonding, and the smoothness is thereby impaired, and that since sufficient resin pressure is not imparted to the splicing portion, firm splicing is not obtained. Then it is impossible to obtain sufficient durability.

The present invention has been made in view of above circumstances, and provides a belt splicing apparatus whereby the spliced belt has high smoothness and sufficient durability, and a method of manufacturing a moving handrail for a passenger conveyor which has high smoothness and sufficient durability.

According to an aspect of the invention, there is provided a belt splicing apparatus including: a mold formed with a cavity into which connecting end portions of a resin-made belt are inserted while opposing each other to connect the end portions by using a bonding resin; a heating unit that heats a bonding resin to more than a flow starting temperature of the bonding resin; and a pressure maintaining unit. The pressure maintaining unit includes: a reservoir communicating with the cavity and maintaining the bonding resin in a fluid state; a pressure transmitting member that transmits pressure to the bonding resin in the fluid state; an urging unit that urges the pressure transmitting member; and an urging force adjusting unit that adjusts an urging force of the urging unit.

According to another aspect of the invention, since the belt splicing apparatus effects splicing while maintaining the bonding resin in a pressurized state by the pressure maintaining unit, there is an advantage in that the spliced belt has high smoothness and sufficient durability.

BRIEF DESCRIPTION OF THE DRAWINGS

Embodiments of the present invention will be described in detail based on the following figures, wherein.

DETAILED DESCRIPTION OF THE INVENTION

First Embodiment

Figure 1:
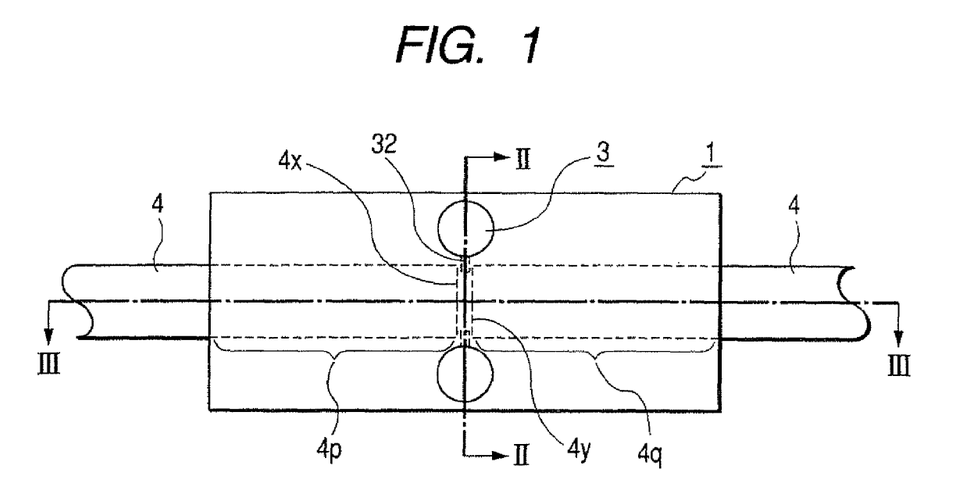
FIG. 1 is a plan view schematically illustrating a belt splicing apparatus according to a first embodiment of the invention.
Figure 2:
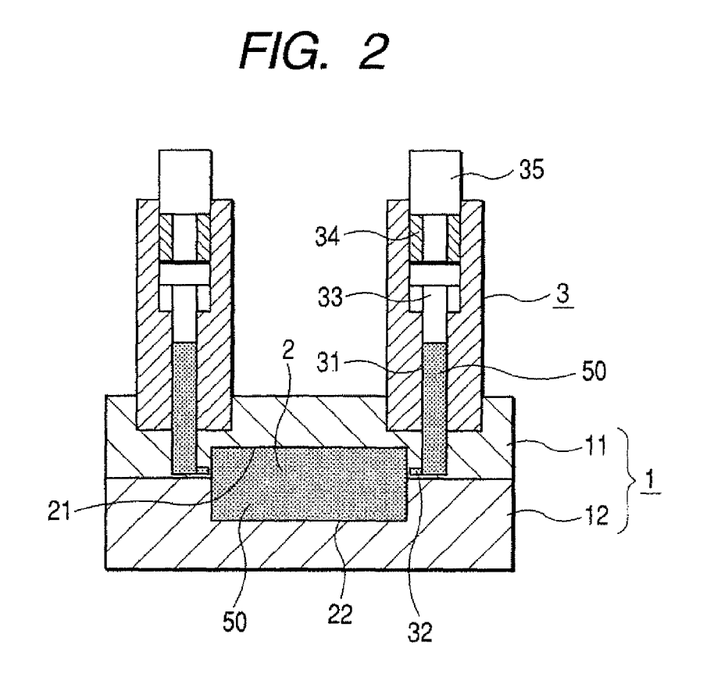
FIG. 2 is a cross-sectional view schematically illustrating the belt splicing apparatus and taken along line II-II in FIG. 1.
Figure 3:
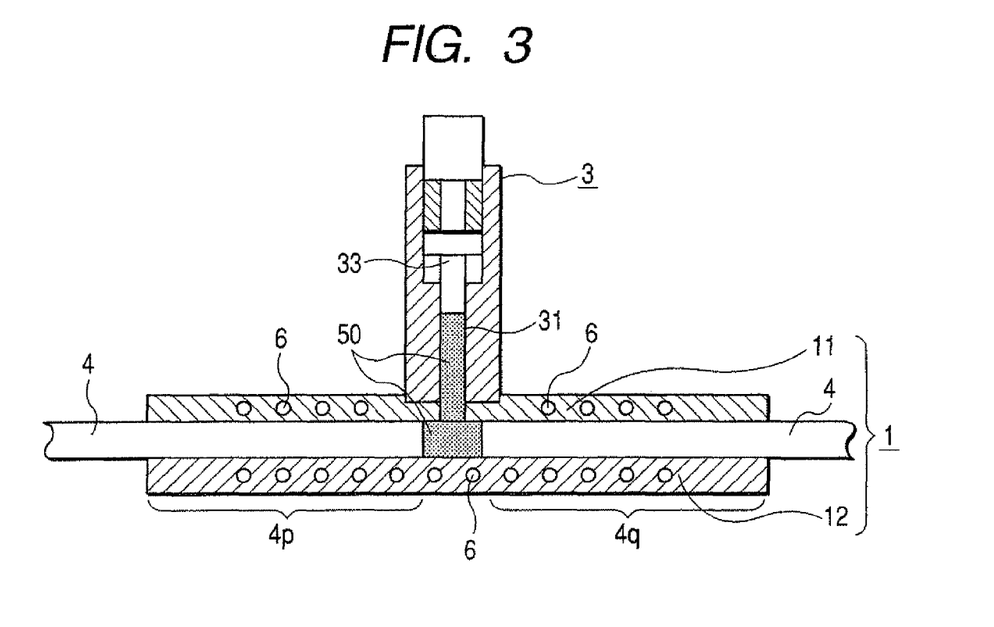
FIG. 3 is a cross-sectional view schematically illustrating the belt splicing apparatus and taken along line III-III in FIG. 1.

FIG. 1 is a plan view schematically illustrating a belt splicing apparatus according to a first embodiment of the invention, and illustrates a state in which connecting end portions 4p and 4q of a belt 4 are inserted while opposing each other. FIG. 2 is a cross-sectional view schematically illustrating the belt splicing apparatus and taken along line II-II in FIG. 1. FIG. 3 is a cross-sectional view schematically illustrating the belt splicing apparatus and taken along line III-III in FIG. 1. It should be noted that, in FIG. 3, a pressure maintaining unit 3, which is disposed away from the line III-III, is also shown for the sake of convenience. In this embodiment, a description will be given of a case where a thermoplastic resin-made belt is spliced by using a thermoplastic resin.

As shown in FIGS. 1 to 3, in the belt splicing apparatus according to this embodiment, a mold 1 into which the connecting end portions 4p and 4q of the belt 4 to be connected are inserted consists of a first mold member and a second mold member. An upper mold 11 which is the first mold member and a lower mold 12 which is the second mold member are capable of being combined together and separated from each other. A cavity 2 is formed in the interior as the upper mold 11 and the lower mold 12 are combined.

A first groove 21 and a second groove 22, which respectively extend toward both ends, are formed in the upper mold 11 and the lower mold 12. The longitudinal shape of the cavity 2 formed by the first groove 21 and the second groove 22 has a shape substantially identical to the longitudinal side surfaces of the connecting end portions 4p and 4q of the belt 4 which are inserted to the cavity 2. The widthwise cross-sectional shape of the cavity 2 has a shape substantially identical to the widthwise cross section of the belt 4 which is inserted to the cavity 2, and the inner walls of the cavity 2 are in close contact with the connecting end portions 4p and 4q of the belt 4.

In addition, the pressure maintaining unit 3 is provided on a substantially central portion in the longitudinal direction of the upper mold 11. The connecting end portions 4p and 4q of the belt 4 are inserted such that connecting end faces 4x and 4y of the belt 4 oppose each other. A bonding resin 50, which is a thermoplastic resin, is disposed in a region where the connecting end faces 4x and 4y of the belt 4 oppose each other in the cavity 2 (this region will be referred to as the "region between the connecting end faces of the belt"). In addition, each of a pair of reservoirs 31 of the pressure maintaining unit 3 has a gate 32. In the mold 1, this gate 32 is open in the region between the connecting end faces of the belt. The reservoir 31 communicates with the cavity 2 through the gate 32. The bonding resin 50, which is the thermoplastic resin, is also stored in the reservoir 31. The bonding resin 50 in the reservoir 31 is continuous with the bonding resin 50 in the region between the connecting end faces of the belt.

The mold 1 is heated by a heating unit 6 such as a heater so that the bonding resin 50 is set to more than flow starting temperature. Pressure is applied to the bonding resin 50 by the pressure maintaining unit 3 to maintain the bonding resin 50 in a pressurized state exceeding the atmospheric pressure. It should be noted that the flow starting temperature is a temperature at which the resin is a liquid phase after undergoing a state of high viscosity and thereby is a fluid state.

Namely, the bonding resin 50 in the reservoir 31 and the bonding resin 50 in the region between the connecting end faces of the belt are continuous with each other and are in the fluid state. Therefore, in the pressure maintaining unit 3, a movable piston 33 which slides on the inner wall of the reservoir 31 serves as a pressure transmitting member for transmitting the pressure to the bonding resin 50, and the movable piston 33 is urged by a spring 34 which is an urging unit, thereby making it possible to pressurize the bonding resin 50 in the fluid state.

It should be noted that, in response to fluctuations of the pressurized state of the bonding resin 50, adjustment is made by a screw 35 which is an urging force adjusting unit, such that the pressure of the bonding resin 50 exceeds the atmospheric pressure to maintain the pressurized state.

Namely, if heating is effected while applying pressure to the bonding resin 50 by the movable piston 33 by adjusting the urging force of the spring 34 in the above-described manner, the bonding resin 50 in the reservoir 31 of the pressure maintaining unit 3 undergoes thermal expansion owing to the heating, so that the movable piston 33 tends to be pushed back. However, as the movable piston 33 is further pressurized by being urged by the spring 34, there is an advantage in that it is possible to suppress the pressure of the bonding resin 50 from being released and the pressure from declining, thereby making it possible to obtain firm splicing. It should be noted that, in the case of the thermoplastic resin-made belt as in this embodiment, the bonding resin 50 and the connecting end faces 4x and 4y and the vicinities of the belt 4 inserted in the cavity 2 are fused together on heating, so that firm splicing is obtained.

Next, if the temperature of the mold 1 is lowered so as to become lower than the flow starting temperature of the bonding resin 50 in order to effect splicing by solidifying the bonding resin 50 in the region between the connecting end faces of the belt 4, the bonding resin 50 starts to shrink and the pressure starts to drop. However, as the movable piston 33 is pushed in by adjusting the urging force of the spring 34 by the screw 35 of the pressure maintaining unit 3, it is possible to maintain the bonding resin 50 in the pressurized state exceeding the atmospheric pressure. Hence, it is possible to prevent voids and sink marks at the spliced portion due to molding shrinkage, and it is possible to obtain firm splicing.

It should be noted that when the temperature of the bonding resin 50 drops below the flow starting temperature as the heating is stopped, the transmission of the pressure ceases. However, as in this embodiment, the connecting end faces 4x and 4y of the belt are inserted up to the substantially central portion of the cavity 2 of the mold 1, and the pressure maintaining unit 3 is installed on the central portion of the mold 1. Therefore, the temperature of the bonding resin 50 between the connecting end faces 4x and 4y of the belt drops most slowly. Since the decline in the temperature of the bonding resin 50 between the connecting end faces 4x and 4y of the belt is the slowest, the pressure is maintained until right before the bonding resin 50 drops below the thermal deformation temperature, so that the sink marks on the spliced portion are prevented efficiently.

It should be noted that although in this embodiment the spring 34 is used as the urging unit of the pressure maintaining unit 3, oil pressure, air pressure, or the like may be used.

Figure 4:
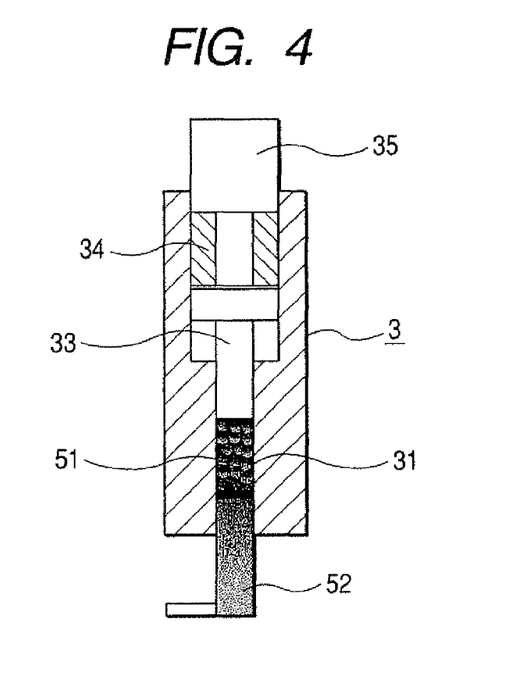
FIG. 4 is a cross-sectional view schematically illustrating another example of a pressure maintaining unit according to the first embodiment of the invention.

FIG. 4 is a cross-sectional view schematically illustrating another example of the pressure maintaining unit 3 according to this embodiment. FIG. 4 shows a case in which, in terms of the state of the resin within the reservoir 31 of the pressure maintaining unit 3, a solid phase 51 and a liquid phase 52 coexist, and the resin in the liquid phase 52 is used as the bonding resin 50. It should be noted that the state of the resin, such as the one shown in FIG. 4, can be obtained not by directly heating such as the reservoir 31 by the heating unit 6, but by providing the pressure maintaining unit 3 on the central portion of the mold 1 and by heating the central portion of the mold 1 by the heating unit 6, such that, in the resin within the reservoir 31, a region close to the mold 1 is set in the liquid phase 52 due to thermal conduction from the mold 1, while a region away from it is set in the solid phase 51.

If all the resin in the reservoir 31 is in the liquid phase, the piston 33, which is the pressure transmitting member, should preferably be sealed by the wall surface of the reservoir 31 so as to slide on the inner wall of the reservoir 31. As shown in FIG. 4, however, as the resin in the vicinity of the piston 33 is set in the solid phase 51, the reverse flow of the bonding resin 50 in the liquid phase can be suppressed by the simplified structure without separately providing a sealing structure. Therefore, it is possible to maintain the pressure of the bonding resin 50 in the pressurized state.

In this embodiment, although a description has been given of the case in which the belt formed of a thermoplastic resin is spliced by using the thermoplastic resin as the bonding resin, the invention is not limited to the same, and the belt may be one formed of a thermosetting resin. It is possible to obtain advantages similar to those of this embodiment if a thermosetting resin in an uncured state is used as the bonding resin.

Second Embodiment

Figure 5A:
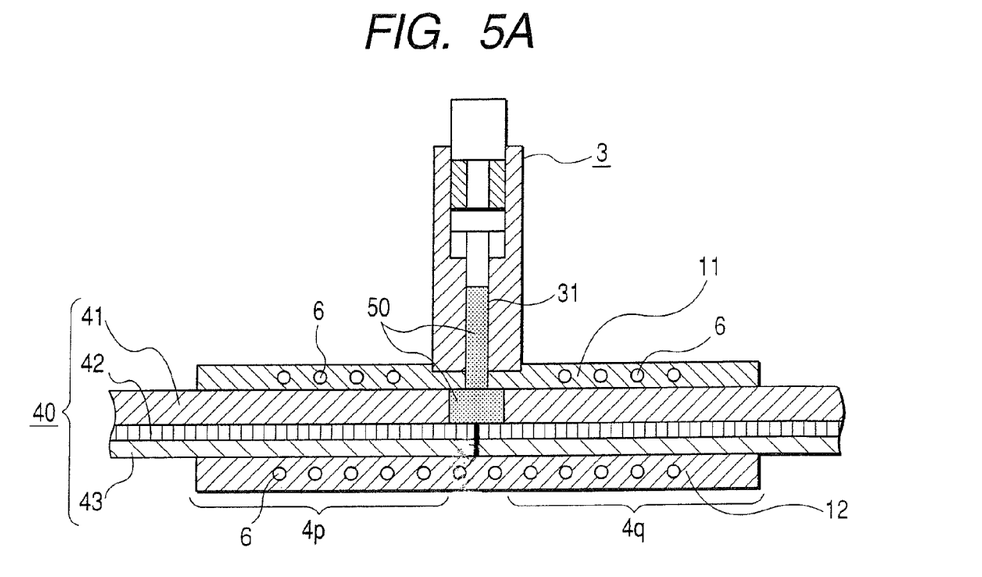
FIG. 5A is a cross-sectional view taken in the longitudinal direction of the belt and schematically illustrating the belt splicing apparatus according to a second embodiment of the invention.
Figure 5B:
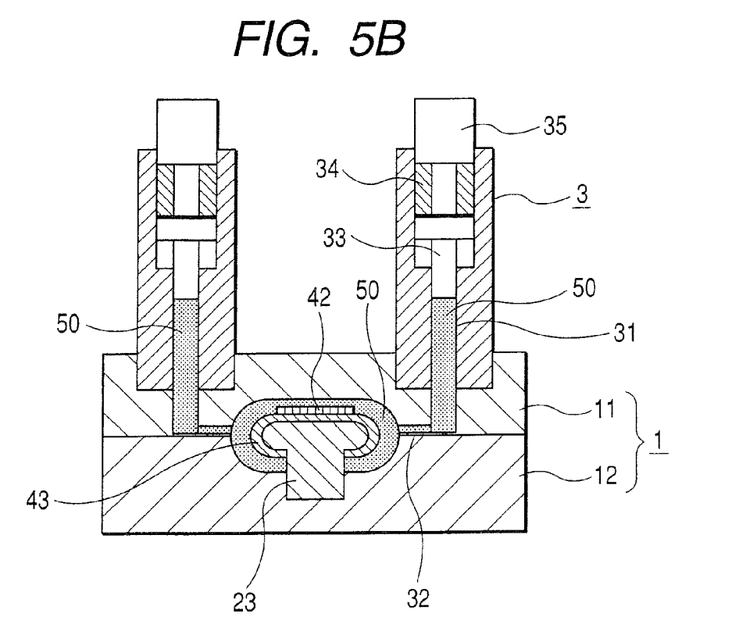
FIG. 5B is a cross-sectional view taken in the transverse direction of the belt and schematically illustrating the belt splicing apparatus according to the second embodiment of the invention.

FIG. 5A is a cross-sectional view taken in the longitudinal direction of the belt and schematically illustrating the belt splicing apparatus according to a second embodiment of the invention. FIG. 5A shows a state in which the connecting end portions 4p and 4q of the belt are inserted. This is a case in which a multilayered belt 40, which is used as a moving handrail for a passenger conveyor, is used instead of the belt 4 in FIG. 3. FIG. 5B is a cross-sectional view taken in the transverse direction of the belt and schematically illustrating the belt splicing apparatus according to this embodiment of the invention. FIG. 5B shows the region between the connecting end faces of the inserted belt.

As shown in FIGS. 5A and 5B, in the multilayered belt 40 of the moving handrail for the passenger conveyor, a belt-shaped tension member 42 made of steel is provided on a canvas 43 similarly extending in the form of a belt. An assembly of the tension member 42 and the canvas 43 is integrally covered with a thermoplastic resin portion 41 by being subjected to hot press molding using a thermoplastic resin, such that the assembly is included in the inner layer and the overall cross section has a shape of the letter C. It should be noted that since the moving handrail for the passenger conveyor has a C-shaped cross-sectional shape, a core 23 corresponding to the inner shape of the letter C is provided in the lower mold 12.

To form the moving handrail for the passenger conveyor by the multilayered belt 40 having the above-described construction, the multilayered belt 40 is prepared in which the thermoplastic resin portion 41 is not provided at the connecting end portions 4p and 4q. The connecting end portions 4p and 4q of the multilayered belt 40 are inserted into the cavity 2 of the belt splicing apparatus while opposing each other, and mating portions of the canvas 43 and mating portions of the steel-made tension member 42, which are exposed at the both ends, are sewn together and are connected. It should be noted that this sewing may be performed before the insertion into the cavity 2.

Next, the bonding resin 50 is supplied to the region between the connecting end faces at the thermoplastic resin portion 41 of the multilayered belt 40, and heating is effected so that the bonding resin 50 becomes a fluid state in the same way as in the first embodiment. The temperature of the bonding resin 50 is then lowered to effect splicing so that the temperature the bonding resin 50 becomes lower than a flow starting temperature, while maintaining the bonding resin 50 in the region between the connecting end faces in the pressurized state by the pressure maintaining unit 3. In the same way as in the first embodiment, it is possible to prevent voids and sink marks at the spliced portion due to molding shrinkage, and obtain firm splicing.

It should be noted that, it is possible to supply the bonding resin 50 in the fluid state to the region between the connecting end faces of the thermoplastic resin portion 41 and to maintain the bonding resin 50 in the pressurized state, by storing the bonding resin 50 in the fluid state in the reservoir 31, by filling this bonding resin 50 in the fluid state in the region between the connecting end faces, and by pressurizing the bonding resin 50 in the fluid state by using the pressure maintaining unit. In addition, the bonding resin 50 can similarly be maintained in the pressurized state by allowing in advance a solid material of a thermoplastic resin to intervene in the region between the connecting end faces and by setting the solid material into a fluid state by the heating unit.

As the thermoplastic resin portion 41 for making up the multilayered belt 40 according to this embodiment, it is possible to use a polyurethane-, polystyrene-, polyester-, polyamide-, or olefin-based resin.

In addition, as the steel-made tension member 42, it is possible to use such as steel cords or reinforcing filaments (polyamide and carbon fibers or the like).

Third Embodiment

Figure 6:
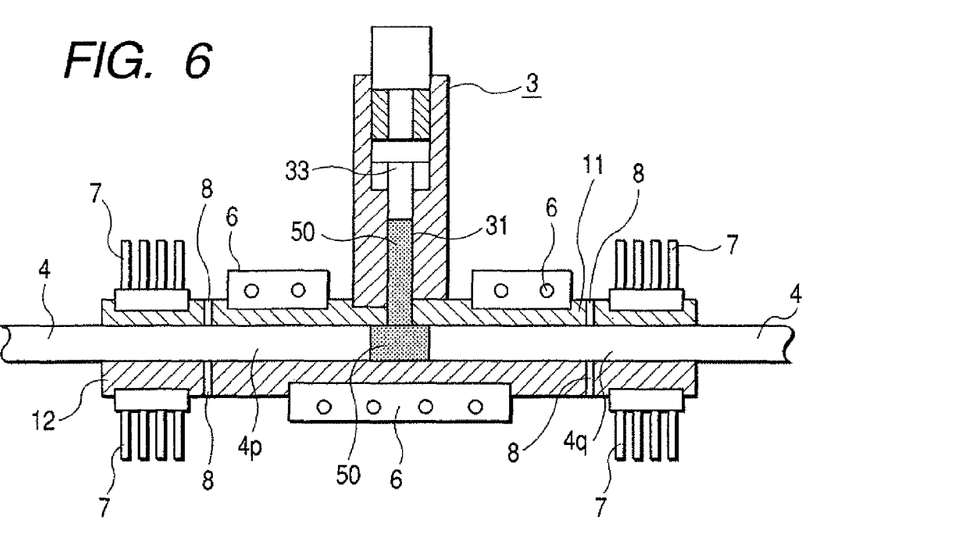
FIG. 6 is a longitudinal cross-sectional view taken in the longitudinal direction of the belt and schematically illustrating the belt splicing apparatus according to a third embodiment of the invention.

FIG. 6 is a longitudinal cross-sectional view of the belt splicing apparatus according to a third embodiment of the invention. This third embodiment is similar to the first embodiment except in the following aspects: The mold 1 has a heat insulating area 8 provided in either end portion region and extending in a substantially perpendicular direction to the longitudinal direction. Further, the mold 1 has the heating unit 6, which is detachable, provided on the inner side of the heat insulating area 8 in the vicinity of the pressure maintaining unit 3, as well as a cooling unit 7 such as fins provided on the outer side of the heat insulating area 8.

According to this embodiment, in the case of the thermoplastic resin-made belt, the bonding resin 50 and the vicinities of the connecting end faces of the belt are heated by the heating unit and are set in the fluid state, and the bonding resin 50 and the vicinities of the connecting end faces of the belt are fused together, allowing firm splicing. In addition, by detaching the heating unit 6 from the mold 1, the temperature of the bonding resin 50 can be lowered efficiently to less than the flow starting temperature.

In addition, since the heat insulating area 8 of the mold 1 makes it possible to prevent the temperature rise of the mold 1 due to the heating unit 6 from being transmitted to the outer side of the heat insulating area 8 of the mold 1. Therefore, it is possible to prevent the temperature from changing abruptly between the portion of the belt 4 which is inserted in the mold 1 and the portion which is not inserted, thereby making it possible to improve the smoothness of the belt. Further, the provision of the cooling unit 7 on the outer side of the heat insulating area 8 of the mold 1 makes it possible to improve the smoothness of the belt more effectively.

Figure 7:
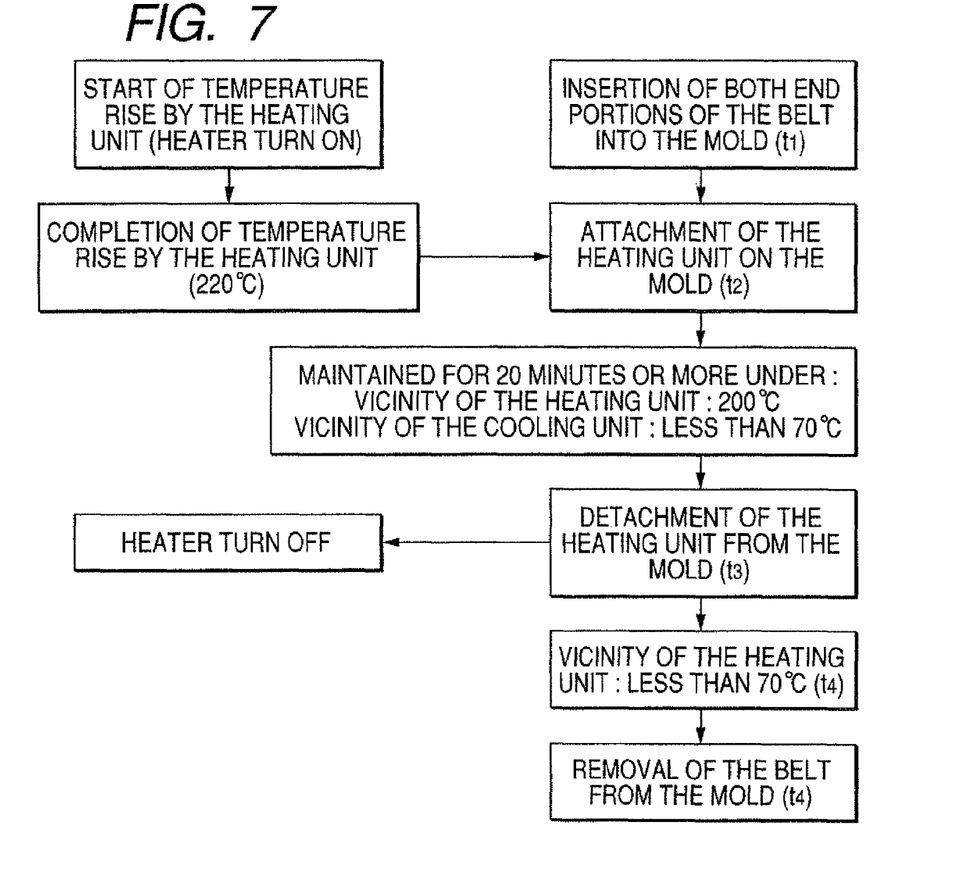
FIG. 7 is a flowchart explaining the forming process in the case where the belt splicing is carried out according to the third embodiment of the invention.
Figure 8:
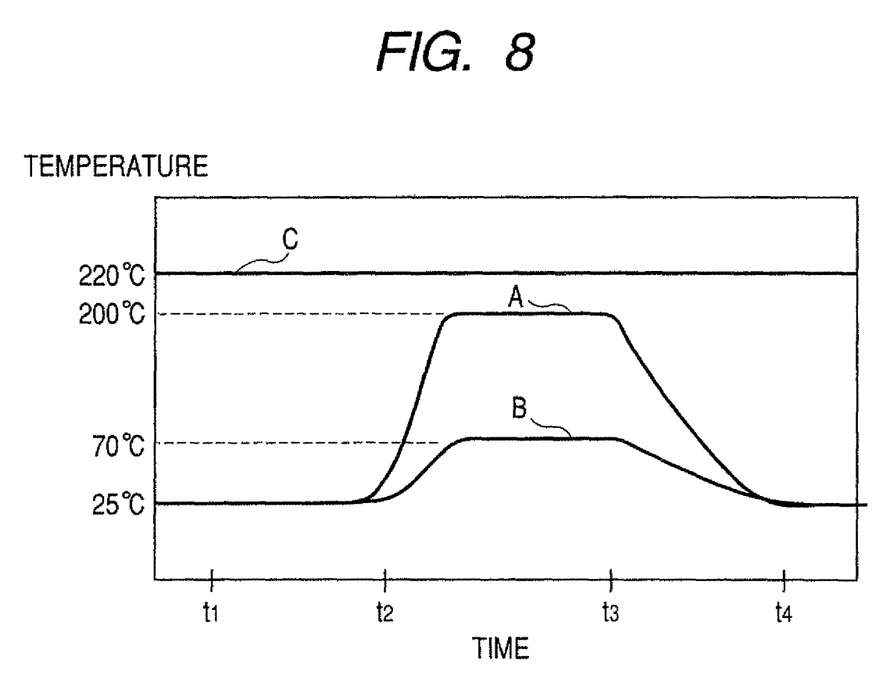
FIG. 8 is a temperature profile diagram illustrating the temperature change in each location of the splicing apparatus in the forming process shown in FIG. 7.

FIG. 7 is a flowchart explaining the forming process in the case where the belt splicing is carried out by using the splicing apparatus according to this embodiment. FIG. 8 is a temperature profile diagram illustrating the temperature change in each location of the splicing apparatus in the above-described forming process. In FIG. 8, A shows the mold temperature in the vicinity of the heating unit 6, B shows the mold temperature in the vicinity of the cooling unit 7, and C shows the temperature of the heating unit 6 itself.

Next, referring to FIGS. 6 to 8, a specific description will be given of a case in which the thermoplastic resin-made belt, the bonding resin 50 between the connecting end faces 4x and 4y, and the bonding resin 50 in the reservoir are a polyurethane resin which is a thermoplastic resin.

The temperature of the heating unit 6 is set in advance to 220° C. which is higher than the flow starting temperature of the polyurethane resin. In the meantime, the connecting end faces 4x and 4y of the belt 4 are inserted up to a substantially central portion of the cavity 2 of the mold 1 in such a manner as to oppose each other with the bonding resin 50 placed therebetween ($t_1$).

Subsequently, the heating unit 6 is attached to the mold 1 ($t_2$). While the bonding resin 50 is being maintained in the pressurized state by the pressure maintaining unit 3, as shown in the first embodiment, the temperature at the vicinity of the heating unit 6 and the temperature at the vicinity of the cooling unit 7 are respectively maintained at 200° C., which is higher than the flow starting temperature of the bonding resin 50, and at less than 70° C., which is lower than the flow starting temperature of the bonding resin 50, for 20 minutes or more. Subsequently, while the bonding resin 50 is being maintained in the pressurized state, the heating unit 6 is detached ($t_3$). The bonding resin 50 is cooled until a temperature thereof drops below 70° C., the upper mold 11 and the lower mold 12 are separated, and the belt 4 is removed ($t_4$).

Through the above-described process, since the heating unit 6 whose temperature is raised in advance is attached and detached, temperature control can be provided efficiently. In addition, the bonding resin 50 is set in the fluid state by being sufficiently heated, and the vicinities of the connecting end faces 4x and 4y of the belt 4 and the bonding resin 50 are fused together, so that firm splicing can be obtained.

In addition, since the fusion and cooling can be effected while the pressure of the bonding resin 50 is being maintained in the pressurized state exceeding the atmospheric pressure by the pressure maintaining unit 3, it is possible to prevent a difference in level between the connecting end portions due to the molding shrinkage of the bonding resin 50 and improve the smoothness. At the same time, since the mold has the heat insulating areas 8 at the both end portion regions, and particularly since the cooling unit 7 is provided on the outer side of each heat insulating area 8, the smoothness improves further.

It should be noted that although in this embodiment, as the belt, a description has been given of the belt formed of a single layer of a thermoplastic resin for the sake of simplicity, even in the case where the multilayered belt shown in the second embodiment is used, advantages similar to those of this embodiment can be obtained, and it is possible to obtain a moving handrail for a passenger conveyor which is firmly spliced and excels in the smoothness.

The entire disclosure of Japanese Patent Application No. 2005-286572 filed on Sep. 30, 2005 including specification, claims, drawings and abstract is incorporated herein by reference in its entirety.

What is claimed is:

1. A method of manufacturing a moving handrail for a passenger conveyor, the method comprising:
    inserting ends of a multilayered belt into a cavity of a mold, opposing and spaced apart from each other, the multilayered belt including a metallic tension member and a canvas molded in a thermoplastic resin, the metallic tension member and the canvas extending substantially continuously along a moving direction of the passenger conveyor;
    connecting mating portions of the metallic tension member and connecting mating portions of the canvas, at the ends of the multilayered belt;
    inserting a thermoplastic resin in a solid phase, as a bonding resin, into a region between the ends of the multilayered belt;
    after inserting the thermoplastic resin in the solid phase, heating the thermoplastic resin in the solid phase so that the thermoplastic resin becomes a fluid bonding resin;
    while maintaining the fluid bonding resin in the fluid phase, applying external pressure to the fluid bonding resin, including maintaining external pressure on the bonding resin using a pressure maintaining unit, the pressure maintaining unit including
        a reservoir communicating with the cavity of the mold and containing an additional quantity of the thermoplastic resin as additional bonding resin and in a fluid phase,
        a pressure transmitting member that transmits pressure from the additional bonding resin in the fluid phase in the reservoir to the bonding resin in the cavity of the mold,
        an urging unit that urges the pressure transmitting member toward the additional bonding resin in the fluid phase in the reservoir, and
        an urging force adjusting unit that adjusts an urging force applied to the urging unit; and
    thereafter, reducing the temperature of the fluid bonding resin to a temperature less than a flow-starting temperature of the bonding resin when in the solid phase, while maintaining pressure on the bonding resin until the bonding resin cools, completing splicing of the ends of the multilayer belt.

2. The method according to claim 1, including heating using a detachable heating unit that heats the bonding resin in the cavity of the mold to a temperature higher than the flow-starting temperature of the bonding resin, the detachable heating unit being detachably mounted to the mold proximate the pressure maintaining unit.

3. The method according to claim 2, including reducing the temperature of the bonding resin in the region between the ends of the multilayered belt by detaching the detachable heating unit from the mold while applying pressure to the bonding resin in the cavity of the mold.

4. The method according to claim 2, including supplying the additional bonding resin in the fluid phase and within the reservoir to the region between the ends using the pressure maintaining unit.

5. The method according to claim 1, including maintaining a portion of the bonding resin that is in the reservoir in the solid phase and that is interposed between the urging unit and the bonding resin that is in the fluid phase and that is in the reservoir.

6. The method according to claim 5, including heating using a detachable heating unit that heats the bonding resin in the cavity of the mold to a temperature higher than the flow-starting temperature of the bonding resin, the detachable heating unit being detachably mounted to the mold proximate the pressure maintaining unit.

7. The method according to claim 6, including reducing the temperature of the bonding resin in the region between the ends of the multilayered belt by detaching the detachable heating unit from the mold while applying pressure to the bonding resin in the cavity of the mold.

8. The method according to claim 6, including supplying the additional bonding resin in the fluid phase and within the reservoir to the region between the ends using the pressure maintaining unit.

9. A method of manufacturing a moving handrail for a passenger conveyor, the method comprising:
    inserting ends of a multilayered belt into a cavity of a mold, opposing and spaced apart from each other, the multilayered belt including a metallic tension member and a canvas molded in a thermoplastic resin, the metallic tension member and the canvas extending substantially continuously along a moving direction of the passenger conveyor;
    connecting mating portions of the metallic tension member and connecting mating portions of the canvas, at the ends of the multilayered belt;
    inserting a thermoplastic resin in a solid phase, as a bonding resin, into a region between the ends of the multilayered belt;
    applying external pressure to the bonding resin in the cavity of the mold by supplying additional bonding resin which is the thermoplastic resin in the fluid phase, to the region between the ends of the multilayered belt;
    after inserting the thermoplastic resin in the solid phase, heating the thermoplastic resin in the solid phase so that the thermoplastic resin becomes a fluid bonding resin;
    while maintaining the fluid bonding resin in the fluid phase, and
    thereafter, reducing the temperature of the fluid bonding resin to a temperature less than a flow-starting temperature of the bonding resin when in the solid phase, while maintaining pressure on the bonding resin until the bonding resin cools, completing splicing of the ends of the multilayer belt.

10. The method according to claim 9, including supplying the additional bonding resin in the fluid phase by applying pressure to the additional bonding resin in the fluid phase via additional thermoplastic resin in the solid phase.

11. The method according to claim 10, including maintaining pressure on the bonding resin using a pressure maintaining unit, the pressure maintaining unit including:
   a reservoir communicating with the cavity of the mold and containing an additional quantity of the thermoplastic resin as additional bonding resin and in a fluid phase;
   a pressure transmitting member that transmits pressure from the additional bonding resin in the fluid phase in the reservoir to the bonding resin in the cavity of the mold;
   an urging unit that urges the pressure transmitting member toward the additional bonding resin in the fluid phase in the reservoir; and
   an urging force adjusting unit that adjusts an urging force applied to the urging unit.

12. The method according to claim 11, including heating using a detachable heating unit that heats the bonding resin in the cavity of the mold to a temperature higher than the flow-starting temperature of the bonding resin, the detachable heating unit being detachably mounted to the mold proximate the pressure maintaining unit.

13. The method according to claim 12, including reducing the temperature of the bonding resin in the region between the ends of the multilayered belt by detaching the detachable heating unit from the mold while applying pressure to the bonding resin in the cavity of the mold.

14. The method according to claim 12, including supplying the additional bonding resin in the fluid phase by applying pressure to the additional bonding resin in the fluid phase via additional thermoplastic resin in the solid phase.

15. The method according to claim 9, including maintaining pressure on the bonding resin using a pressure maintaining unit, the pressure maintaining unit including:
   a reservoir communicating with the cavity of the mold and containing an additional quantity of the thermoplastic resin as additional bonding resin and in a fluid phase;
   a pressure transmitting member that transmits pressure from the additional bonding resin in the fluid phase in the reservoir to the bonding resin in the cavity of the mold;
   an urging unit that urges the pressure transmitting member toward the additional bonding resin in the fluid phase in the reservoir; and
   an urging force adjusting unit that adjusts an urging force applied to the urging unit.

16. The method according to claim 15, including heating using a detachable heating unit that heats the bonding resin in the cavity of the mold to a temperature higher than the flow-starting temperature of the bonding resin, the detachable heating unit being detachably mounted to the mold proximate the pressure maintaining unit.

17. The method according to claim 16, including reducing the temperature of the bonding resin in the region between the ends of the multilayered belt by detaching the detachable heating unit from the mold while applying pressure to the bonding resin in the cavity of the mold.

18. The method according to claim 16, including supplying the additional bonding resin in the fluid phase and within the reservoir to the region between the ends using the pressure maintaining unit.

* * * * *